Feb. 17, 1970  A. M. PEACH  3,495,689

DISC BRAKE CALIPER MOUNTING STRUCTURE

Filed May 6, 1968  6 Sheets-Sheet 1

INVENTOR.
Arthur M. Peach
BY
Harness, Tolburtt & Baldwin
ATTORNEYS.

Feb. 17, 1970  A. M. PEACH  3,495,689
DISC BRAKE CALIPER MOUNTING STRUCTURE
Filed May 6, 1968  6 Sheets-Sheet 2
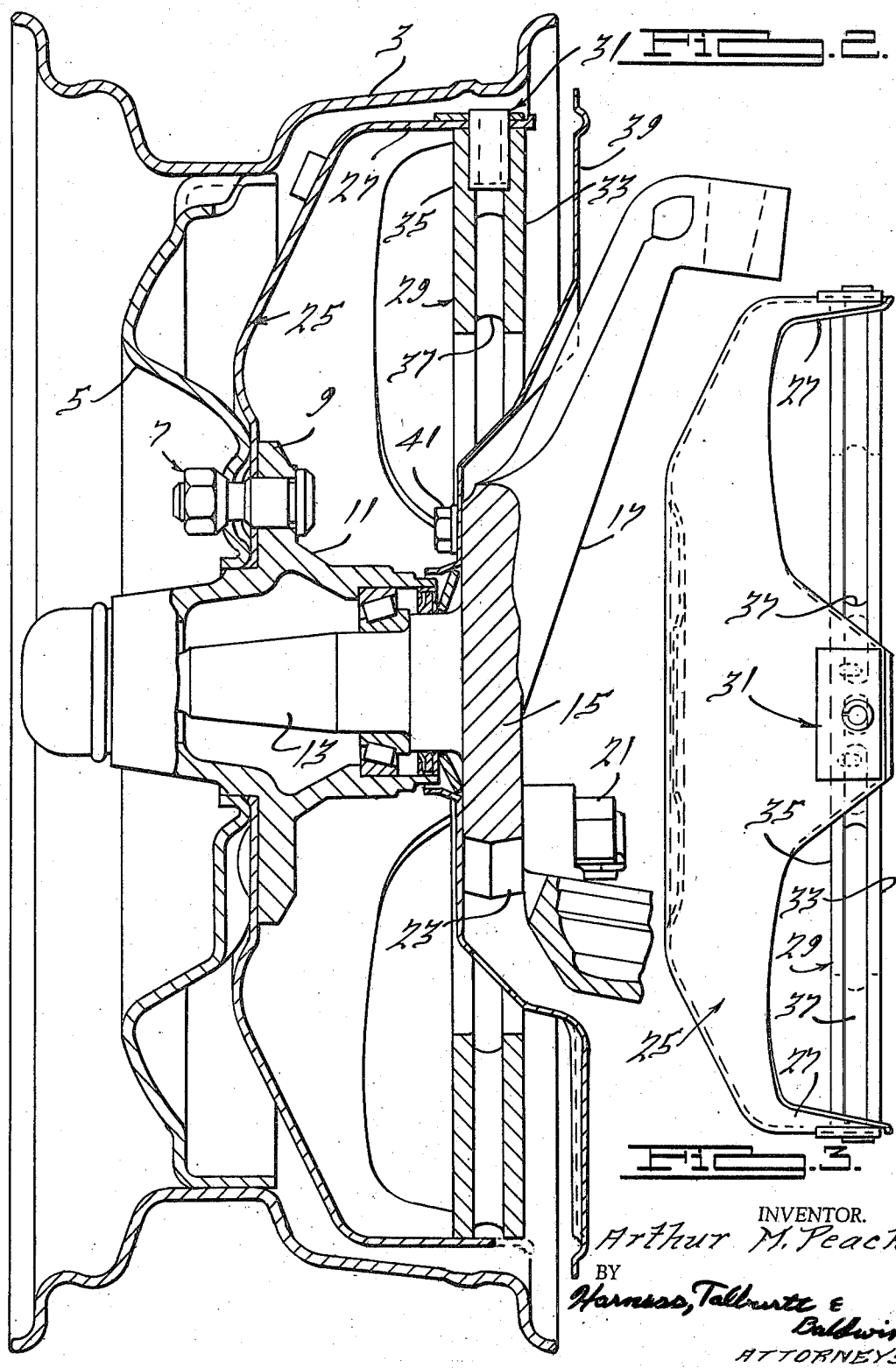
INVENTOR.
Arthur M. Peach
BY
Harness, Dickey & Baldwin
ATTORNEYS.

Feb. 17, 1970　　　A. M. PEACH　　　3,495,689
DISC BRAKE CALIPER MOUNTING STRUCTURE
Filed May 6, 1968　　　　　　　　　　　6 Sheets-Sheet 3

INVENTOR.
Arthur M. Peach
BY
Harness, Dickey & Baldwin
ATTORNEYS.

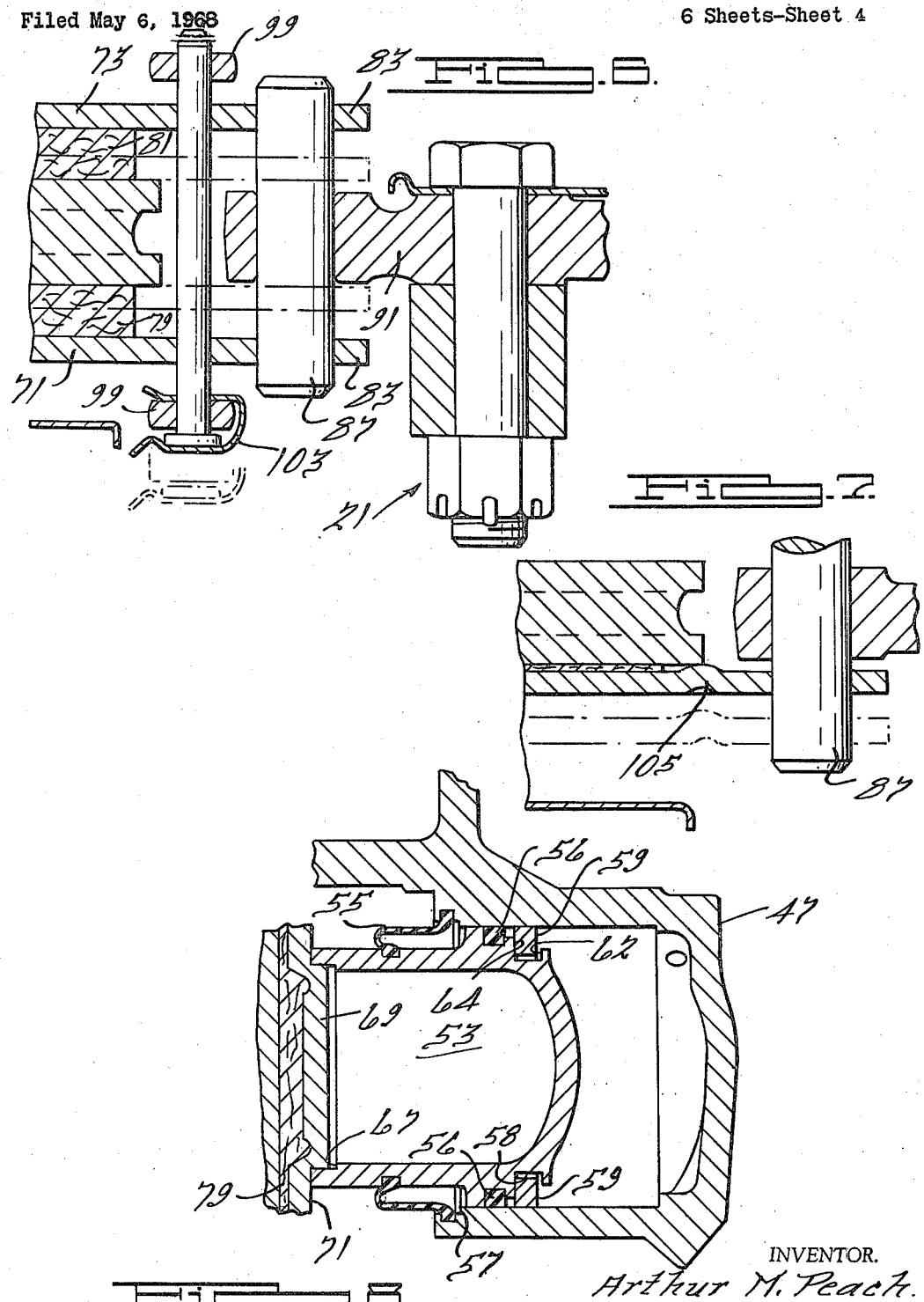

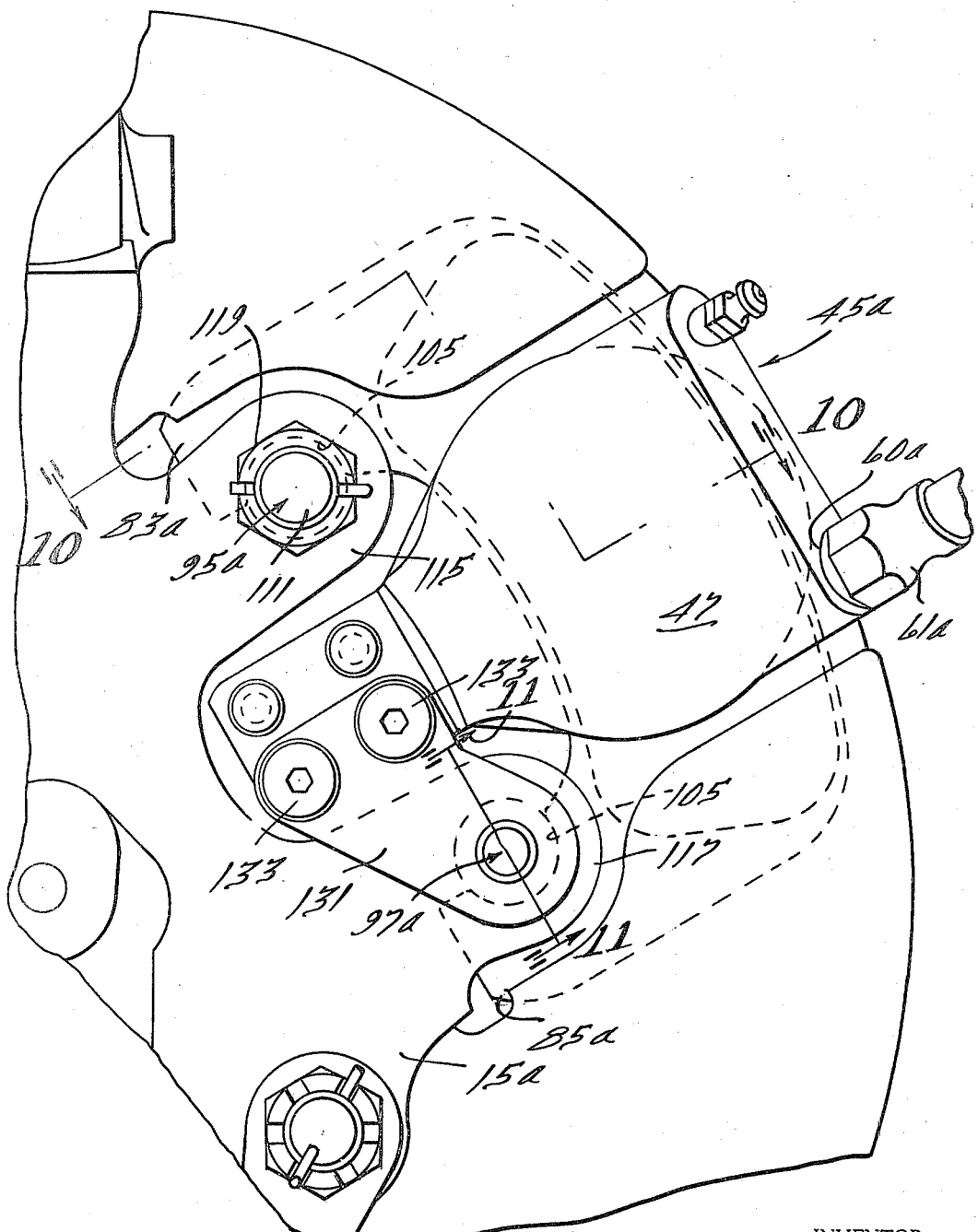

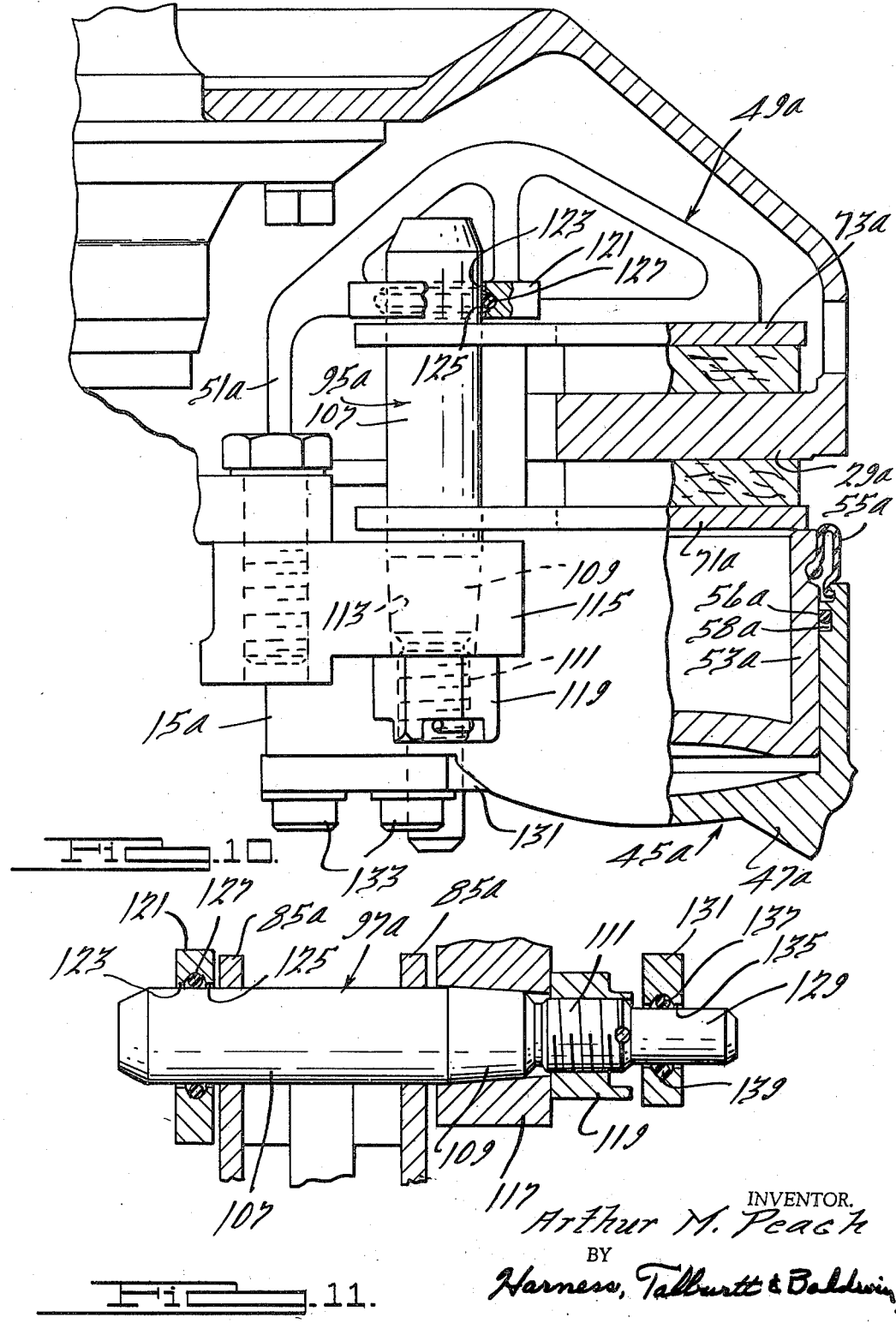

United States Patent Office 3,495,689
Patented Feb. 17, 1970

3,495,689
DISC BRAKE CALIPER MOUNTING STRUCTURE
Arthur M. Peach, Detroit, Mich., assignor to Chrysler Corporation, Highland Park, Mich., a corporation of Delaware
Continuation-in-part of application Ser. No. 582,855, Sept. 29, 1966. This application May 6, 1968, Ser. No. 748,137
Int. Cl. F16d 55/224
U.S. Cl. 188—73
2 Claims

ABSTRACT OF THE DISCLOSURE

Disc brake assembly including an internal caliper slidably connected to brake lining carrying members which are slidably mounted on pins attached to a force receiving member. In one embodiment a ring-shaped member in an annular recess of an actuating piston frictionally engages the wall of the cylinder in which the piston slides to prevent "knock-back" of the piston.

Background of the invention

This application is a continuation-in-part of copending application Ser. No. 582,855 filed Sept. 29, 1966, now abandoned; entitled Disc Brake.

This invention relates to brakes for vehicles, and more particularly to a brake of the disc type particularly adapted for automotive vehicles.

Disc brakes are well-known and the various types thereof usually fall into one or more of several categories. For example, there are fixed caliper, swinging caliper and floating caliper types of disc brakes which are respectively fixed, pivotally and slidably connected to a fixed force taking or receiving member. These caliper types of disc brakes have been mounted so that the calipers externally straddle a rotating disc or internally straddle an inwardly extending and outwardly supported ring-shaped disc member.

The calipers usually contain one or more fluid operated pistons on one or both sides of the disc member for forcing brake shoes having linings thereon into engagement with the disc member. The present invention relates to a floating caliper type of disc brake in which the caliper is mounted so that it internally straddles an outwardly supported ring-shaped disc member. The caliper has a fluid operated piston on one side of the disc member adapted to engage one brake shoe of a pair of brake shoes mounted in a floating manner relative to the caliper and also relative to the force-taking member.

Disc brake mechanisms having calipers which internally straddle a ring-shaped disc member or annulus permit the use of a brake disc diameter which is greater than the permissible diameter of the disc of an externally mounted caliper type of disc brake. Thus, larger braking moments may be obtained for the same braking force. However, it is essential that the various parts of internal caliper disc brakes be precisely constructed to withstand the high braking moments without causing undue wear on the brake linings and without causing failure of the brake through fracture, shear or undue distortion of the brake parts.

While prior known internally mounted disc brakes have satisfactorily met the requirements necessary to prevent undue wear and to prevent failure, the brake parts were usually quite heavy and complicated in design, resulting in an expensive brake.

Accordingly, one of the primary objects of this invention is to provide a disc brake having disc annulus internally surrounded by a caliper, the brake being adapted to function effectively without undue brake lining wear and without the complicated structural design heretofore required.

Another object of this invention is the provision of a disc brake of the class described in which torque produced forces resulting from the contact of the brake shoes with the disc are transferred to a fixed force-taking or receiving member, thus relieving the caliper of external forces which tend to cause uneven lining wear. The caliper serves solely as a clamping device.

A further object of this invention is to provide a disc brake such as described in which means are provided to maintain the brake lining in the proper relationship with the disc ring or annulus, thereby further tending to reduce uneven brake lining wear.

Still another object of this invention is to provide a disc brake of the type described in which the brake linings are keyed to the brake shoes to inhibit separation thereof, and in which one of the brake shoes is adapted to have a seating relationship with a force-producing piston to facilitate and maintain proper alignment of the moving parts of the brake.

Another object of this invention is to provide a disc brake of the class described in one embodiment of which the disc annulus is adapted to be effectively cooled during rotation.

A further object of the present invention is to provide a disc brake such as described which is rigid and stable, but not unduly heavy or complicated.

Still another object of this invention is to provide a disc brake of the type described in which the brake shoes and linings may be removed and installed easily and quickly.

A further object of this invention is to provide a disc brake such as described which is simple and economical in construction, and effective in operation.

Other objects and advantages of the present invention will be apparent as the description progresses.

In the accompanying drawings, in which two of various possible embodiments are illustrated, FIG. 1 is a rear elevational view of a disc brake, constructed in accordance with one embodiment of this invention, mounted on a wheel, certain parts being broken away and removed for clarity;

FIG. 2 is a section taken along line 2—2 of FIG. 1, certain wheel parts being added for clarity;

FIG. 3 is a side elevation, on a reduced scale, of the disc assembly shown in FIG. 1;

FIG. 6 is a section taken along line 6—6 of FIG. 1;

FIG. 7 is a section taken along line 7—7 of FIG. 1;

FIG. 8 is a view similar to FIG. 5 taken along line 8—8 of FIG. 1 showing certain parts in a moved position;

FIG. 9 is a fragmentary elevational view of a second embodiment of this invention;

FIG. 10 is a view taken generally along line 4—4 of FIG. 9, certain parts being shown in section; and FIG. 11 is a section taken along lines 11—11 of FIG. 9.

Like parts are represented by corresponding reference characters throughout the several views of the drawings.

Figure 1:
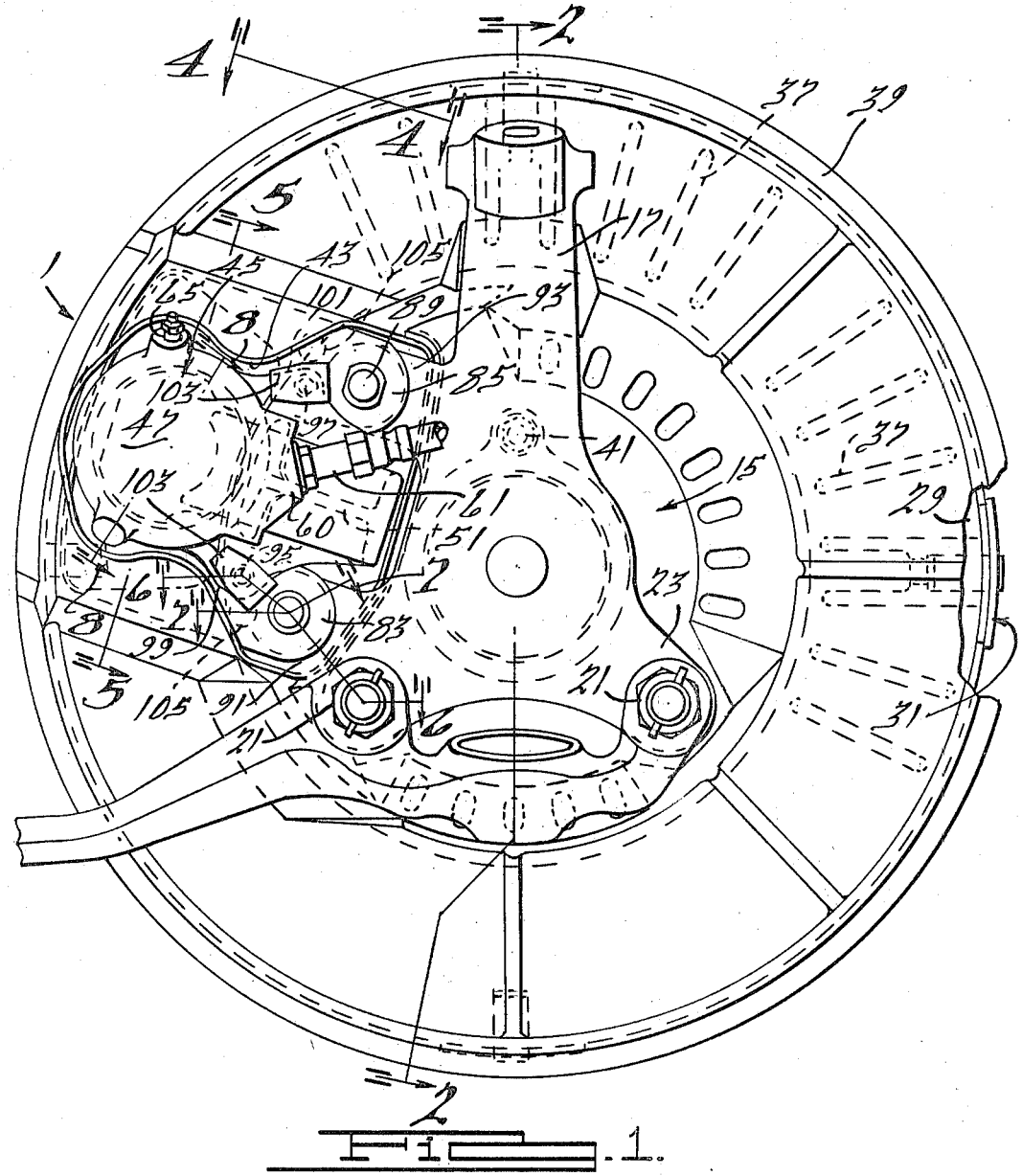

Referring now to the drawings, a disc brake constructed in accordance with one embodiment of this invention is generally indicated at 1. The brake is associated with a vehicle wheel (FIG. 2) having a rim 3 and a wheel body 5 secured by bolt and nut assemblies 7 to a flange 9 of a hub 11 rotatably mounted on a spindle 13. Spindle 13 forms part of a forging 15 which has an upwardly extending arm 17 adapted to be connected to an upper suspension control arm (not shown). A lower steering knuckle arm 19 (FIG. 1) is connected by bolt and nut assemblies 21 to projections 23 on forging 15 and is adapted to be connected to a tie rod (not shown).

A disc support 25 is also secured to flange 9 by bolt and nut assemblies 7. Support 25 is generally saucer-shaped and has four fingers 27 equally spaced around the circumference of the support. A ring-shaped disc or annulus 29 is connected to the fingers 27 by clamping plate and pin assemblies 31. Disc 29 comprises two walls 33 and 35 separated by a plurality of webs 37. The spaces between webs 37 permit air to be circulated through the disc for carrying away heat generated in the disc. A circular splash shield 39 is secured to the outside of forging 15 by a bolt 41 and bolt and nut assemblies 21 and is slightly larger than disc 29 so that the latter is protected from road water and dirt.

Figure 4:
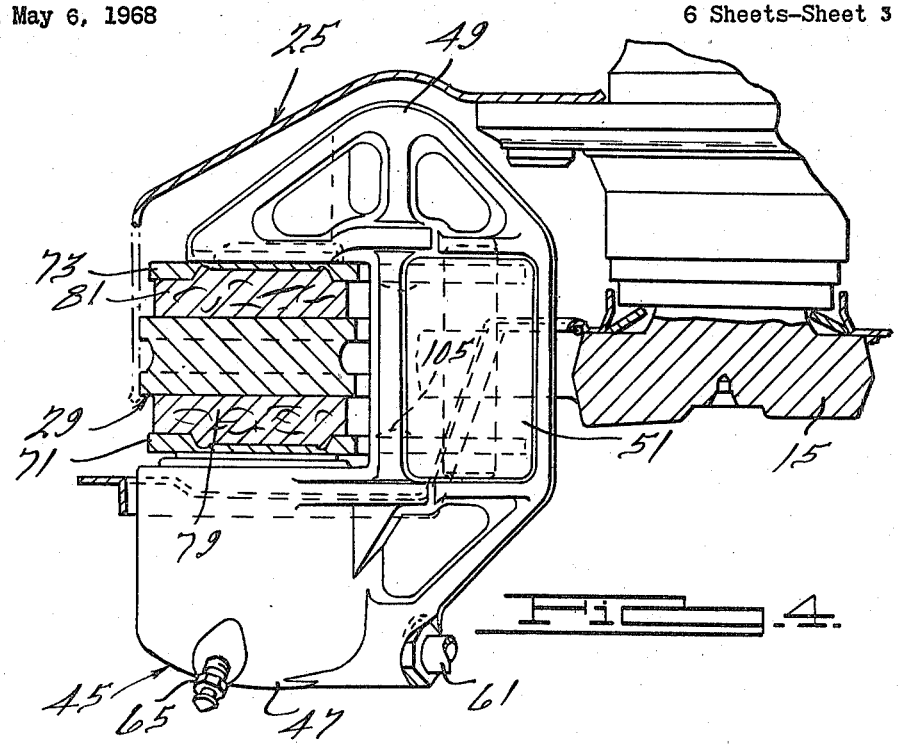
FIG. 4 is a fragmentary elevation taken along line 4—4 of FIG. 1, certain parts being removed for clarity.

An opening 43 (FIG. 1) in shield 39 is provided to permit mounting of a floating caliper body or yoke 45. Caliper 45 is in the form of a C-shaped casting having a cylinder or jaw portion 47 located on one side of disc 29 and a backing or jaw portion 49 on the other side of the disc. The portions 47 and 49 are connected together by a web portion 51 which passes inside the disc as shown in FIG. 4.

A piston 53 is reciprocably mounted in cylinder portion 47 for movement toward and away from the disc 29. Piston 53 is provided with a flexible annular sealing member 55 for preventing the ingress of dust, etc., into the bore of the cylindrical portion 47. An annular seal 56 is located near the inner end of piston 53 and adjacent a shoulder 57 for preventing the passage of fluid beyond the shoulder. Inwardly of seal 56 in an annular recess 58 is a preferably steel drag ring 59 which is adapted to prevent excessive "knock-back" of piston 53 as explained hereinafter. The recess has a width which is slightly larger than the width of ring 59 to provide clearance between the ring and the edges 62 and 64 of the recess. This clearance is provided to prevent, in a manner to be described, the residual force on linings 79 and 81 due to caliper and pad deflection from maintaining the linings in an actuated position upon brake release.

Cylinder 47 is provided with a fluid inlet 60 into which a fluid line fitting 61 (FIG. 1) is adapted to fit for supplying fluid under pressure to the cylinder to supply the power force for the piston. A conventional bleed aperture 63 and fitting 65 are also provided in cylinder portion 47 for bleeding air from the fluid system.

Figure 5:
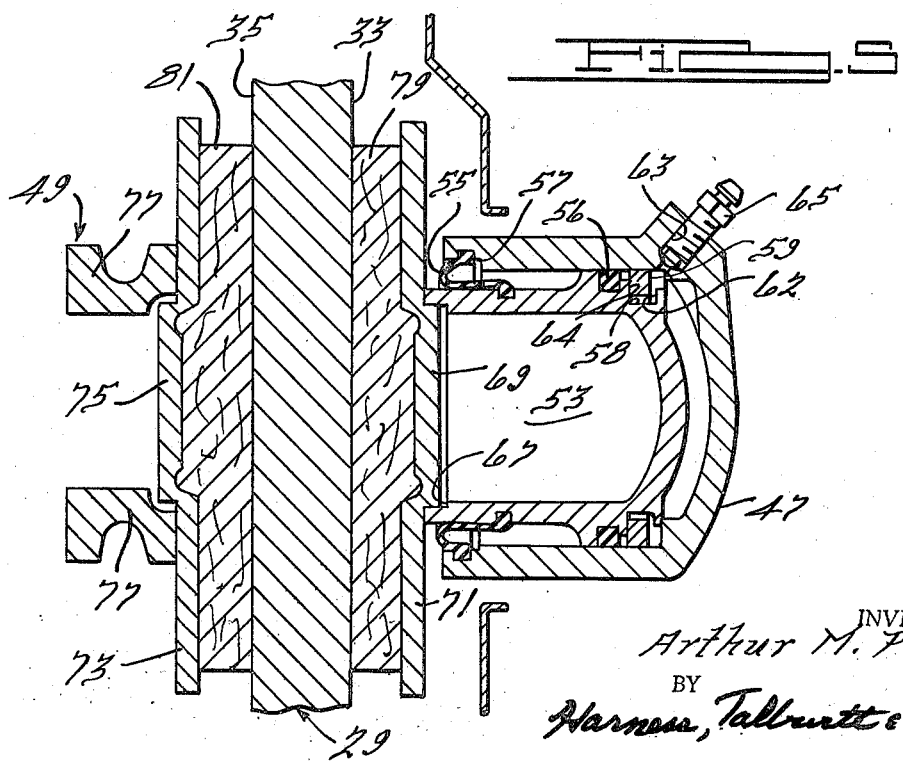
FIG. 5 is a section taken along line 5—5 of FIG. 1.

Piston 53 is formed with a seat 67 at its outer end into which a circular raised portion 69 of a brake shoe or plate 71 is adapted to nest for aligning the shoe with the piston. Shoe 71 is one of a pair of shoes or plates 71 and 73 which are located on opposite sides of disc 29. Shoe 73 has a circular raised portion 75, similar to portion 69 which is located between a pair of fingers 77 (FIG. 5) of backing portion 49. Each shoe is identical and may be made on the same stamping die. The shoes 71 and 73 are recessed on their inner faces in alignment with the respective portions 69 and 75 so that shoe linings 79 and 81 may be molded in place on the shoes, thus facilitating and economizing production costs. The shoes thus function as brake lining carrying members.

Each of the brake shoes 71 and 73 has two depending foot portions 83 and 85 from the inner end thereof which have recesses or holes therein extending axially relative to the wheel axis. The foot portions 83 and 85 are slidably mounted on force-taking support pins 87 and 88, respectively. Pins 87 and 89 have a press fit in bores extending through ears or projections 91 and 93 formed on forging 15 and extend outwardly from the latter on both sides thereof. It will thus be seen that the brake shoes 71 and 73 are adapted to slide or float toward and away from disc 29 on pins 87 and 89.

The caliper body 45 is adapted to float or slide relative to the brake shoes 71 and 73 and also relative to forging 15 by means of mounting pins 95 and 97 located radially inwardly from the inner periphery of the annular disc 29. These pins extend through axially directed holes in ears 99 and 101 on opposite sides of cylinder portion 47 and on opposite sides of backing portion 49 and are maintained therein by retaining clips 103. The pins also extend through shoes 71 and 73 between the ears on portions 47 and 49 so that the caliper 45 is adapted to slide relative to the shoes. Moreover, the pins 95 and 97 maintain the shoes and caliper in alignment in an axial direction, thus tending to prevent uneven wear on the shoe linings 79 and 81. Also, by placing the shoes equidistantly from the sides of disc 29, the shoes do not tend to twist the disc 29 and hence, uneven wear due to such twisting is also substantially prevented.

Assuming that the disc 29 is rotating in a clockwise direction as viewed in FIG. 1, operation of the disc brake of this invention is as follows:

It is also assumed that the shoe linings 79 and 81 are initially slightly out of contact with the side walls 33 and 35 of disc 29. When pressure is applied to the brake pedal (not shown) in the vehicle, fluid under pressure is admitted to the cylinder 47 through inlet 60a. Piston 53 is moved outwardly of the cylinder toward disc 29 and shoe lining 79 is moved into contact with the disc. At substantially the same time, due to the friction of shoe 71 on pins 95 and 97, and on torque-taking pins 87 and 89, the pressure of the fluid in cylinder 47 reacts against the inner end of the piston to remove the caliper to the left as shown in FIG. 4. As the caliper moves in this direction brake shoe 73 moves toward disc 29 and shoe lining 81 is moved into contact with the wall 35 of disc 29.

As the linings 79 and 81 are moved into contact with the opposite side walls of disc 29, the caliper 45 moves slightly to the left as viewed in FIG. 4, and the shoes 71 and 73 move closer together on force-taking pins 87 and 89. Thus, the caliper 45 and the shoes 71 and 73 freely float on their connecting elements. The force of the torque created by the engagement of the brake linings 79 and 81 is transferred through the shoes 71 and 73 to the pins 87 and 89. None of the torque is absorbed by the caliper 45 per se. Since the connections between the pins 87 and 89 and the shoes 71 and 73, which transmit the torque-produced forces to the fixed pins, are substantially equidistant from the sides of the disc, the moments produced on pins 87 and 89 are substantially equal and opposite. Hence, there is no tendency on the part of the shoes or caliper to twist. Accordingly, there is substantially no tendency to produce uneven brake lining wear.

As the piston 53 moves toward the disc, and cylinder portion 47 moves away from the piston, ring 59 moves outwardly in the cylinder bore under the impetus of the outwardly moving edge 62 of recess 58. When the linings 79 and 81 firmly engage the disc sides 33 and 35, respectively, the fluid pressure in cylinder 47 causes the linings to be compressed slightly and also causes the caliper body per se to open slightly, i.e., cylinder portion 47 and backing portion 49 tend to move away from one another. When the brake pedal is released, the residual forces on the linings, due to the lining deflection, tend to move the piston away from the disc and due to caliper deflection, tend to move the cylinder portion further onto the piston. This causes the piston to move into the cylinder relative to the caliper 43. As the cylinder portion 47 and piston 53 move in this manner, ring 59, which has a frictional dragging engagement with the bore of the cylinder remains substantially stationary in the bore. However, relative to piston 53, it moves from engagement with inner edge 62 of recess 58 to engagement with outer edge 64. When the ring contacts edge 64 further movement of the piston away from the disc is inhibited. The clearance of recess 58 and the deflections of caliper 45 and linings 79 and 81 are such that the linings, when the caliper returns to its normal position, are just slightly engaging the disc. This slight engagement is preferable so that when pressure is next applied to the brake pedal, the linings do not have to be moved any significant distance before gripping the disc.

As mentioned previously, the drag ring 59 also prevents excessive "knock-back" of the piston. Knock-back is the term used when a piston is moved or jarred into the cylinder due to various types of forces, such as the impact of a wheel against a curbing, for example, or hard cornering of the automobile. If the piston is not held in a position which maintains the brake linings close to the disc, i.e., if the piston were permitted to move into the cylinder, a substantial portion of the movement of the brake pedal the next time pressure is applied to the latter is devoted just to moving the piston out of the cylinder, rather than increasing the pressure applied by the brake linings to the disc.

As set forth above, the location and arrangement of the brake shoes 71 and 73 and caliper 45 with respect to the forging 15 insure substantially even wear on the linings 79 and 81. Shoes 71 and 73 are provided with a raised projection or hump 105 (FIG. 7) which contacts the adjacent side wall of the disc when the linings are worn to a point at which they need to be replaced. The hump 105 will engage the adjacent side of the disc and create a clearly audible noise to indicate to the driver that the shoes and linings need to be replaced.

Replacement of the worn brake linings and the shoes with new linings and shoes is easily accomplished. The wheel is first turned until one of the openings between two of the fingers 27 of disc support 25 is radially aligned with the shoes 71 and 73. The retaining clips 103 are then removed and the pins 95 and 97 pulled out of the shoes 71 and 73 and caliper ears 99 and 101. The caliper 45 is next moved outwardly upwardly (as viewed in FIGS. 4 and 6) until there is sufficient clearance between the outer caliper ears 99 and 101 and the outer ends of pins 87 to permit the shoe 73 to be slipped off pins 87 and pulled outwardly in a radial direction from the caliper. Movement of the caliper outwardly in this manner causes piston 53 and ring 59 to be forced into the cylinder. The caliper may then be pushed inwardly downwardly (as viewed in FIGS. 4 and 6) until there is sufficient clearance between the inner caliper ears 99 and 101 and the inner ends of pins 87 to permit the shoe 71 to be slipped off pins 87 and pulled outwardly in a radial direction. New composite shoes and linings are then inserted in a reverse manner. The pins 95 and 97 are next replaced and the retaining clips 103 are attached.

A second embodiment of this invention is shown in FIGS. 9–11. Like the embodiment shown in FIGS. 1–8, the second embodiment includes a floating caliper body or yoke 45a. Caliper 45a is in the form of a C-shaped casting having a cylinder or jaw position 47a located on one side of a disc 29a and a backing or jaw portion 49a on the other side of the disc. The portions 47a and 49a are connected by a web portion 51a which passes inside the disc as shown in FIG. 10.

A piston 53a is reciprocably mounted in cylinder portion 47a for movement toward and away from the disc 29a. Piston 53a is provided with a flexible annular sealing member 55a for preventing the ingress of dust, etc., into the bore of the cylindrical portion 47a. An annular seal 56a is also provided in a recess 58a for preventing the passage of brake fluid from the cylindrical bore.

Cylinder 47a is provided with a fluid inlet 60a into which a fluid line fitting 61a is adapted to fit for supplying fluid under pressure to the cylinder to supply the power force for the piston 53a. The outer end of the piston 53a and a brake shoe or plate 71a may be constructed in the same manner as the piston and shoe illustrated in FIG. 8.

Shoe 71a is one of a pair of brake shoes 71a and 73, each of which has two depending foot portions 83a and 85a from the inner end thereof which recesses on cutouts 105 extending axially relative to the wheel axis.

Caliper body 45a is adapted to float or slide relative to the brake shoes 71a and 73a and also relative to a forging member 15a by means of mounting pins 95a and 97a. These pins 95a and 97a have a main body portion 107 of one diameter. One end of body portion 107 is tapered as indicated at 109 and a threaded portion 111 extends axially from such tapered portion.

Tapered portions 109 are pressed into tapered bores 113 in ears or projections 115 and 117 on the forging 15a and are thus generally cantilevered relative to the forging. These tapered portions have adjacent portions of different diameters which mate with similar portions in bores 113. Pins 95a and 97a are prevented from being withdrawn from the bores 113 by nuts 119 tightened against the ears 115 and 117 on threaded portions 111.

The backing or jaw portion 49a of caliper body 45a has laterally extending ears 121 thereon. Ears 121 are provided with holes or bores 123 having annular recesses 125 therein. Mounted in each recess 125 is a bushing means, such as an O-ring 127, which surrounds the main body portion 107 of the respective pin.

The main body portions 107 of pins 95a and 97a extend through the recesses 105 of shoes 85a so that the caliper body 45a and the shoes 85a are slidably connected, in an axial direction with regard to the wheel, to the forging member 15a. In addition to the two point support provided caliper body 45a by the relationship between ears 121 and pins 95a and 97a, a third support point is provided by a mounting shaft or extension pin 129 extending from the threaded portion 111 of pin 97a.

A mounting bracket member 131 is secured to the radial inner end portion of the cylinder or jaw portion 47a of body 45a by fasteners 133. Bracket 131 has an axially extending bore 135 therein with an annular recess 137 being formed in the bore. A bushing means, such as an O-ring 139, is located in recess 137 and surrounds extension pin 129. Thus, bracket 131 is slidably mated with the pin 129.

Like the pins 95 and 97, the pins 95a and 97a maintain the shoes and the caliper in alignment in an axial direction, thus tending to prevent uneven wear on the shoe linings. The shoes and caliper are adapted to slide axially and independent of one another on the pins 95a and 97a in response to brake pedal actuation and brake lining wear. The resilient bushings 127 and 129 permit the caliper to deflect during brake application without undue restraint by pins 95a and 97a and also permit the caliper to follow the disc during angular movement of the latter, such as may occur during hard cornering movements of the vehicle.

The caliper body may easily be removed for repair or replacement of the brake shoes by first removing bracket 131 and nuts 119. The disc member 29a is then removed and as it is pulled from its mounting, the caliper body, shoes and pins 95a and 97a move with the disc 29a, thereby making the shoes readily accessible for replacement.

It will be seen that the disc brake of this invention is adapted to function effectively without causing uneven wear on the brake linings. The brake shoes and linings are maintained, by the various parts of this invention, in a substantially parallel relationship with the sides of the disc, and the connection of the shoes to a force-receiving forging are substantially equidistant in an axial direction from the sides of the disc, thereby inhibiting uneven lining or wear. Moreover, the provision of the drag ring 59 in recess 58 prevents piston knock-back and permits substantially all of the brake pedal travel to be devoted to increasing the pressure applied by the brake linings to the disc.

In addition to the increased braking moments obtained by internally mounting the caliper brake of this invention, the rigid construction of the caliper body reduces body deflection, thereby permitting a reduction in the master cylinder-caliper piston ratio. This permits either a smaller master cylinder to be used to obtain the same braking force, or a larger braking force may be obtained with the same master cylinder.

In view of the foregoing, it will be seen that the several objects and other advantages are achieved.

It will be understood that the invention is not to be limited to the exact constructions shown and described, but that various changes and modifications may be made.

What is claimed is:

1. A disc brake for a vehicle wheel comprising a rotatable annular disc, a relatively stationary force-receiving member, a pair of brake lining carriers, brake linings carried by said brake lining carriers, two pin members located radially inwardly from the inner periphery of said annular disc and connected to and extending in a generally cantilevered fashion away from said force-receiving member, said pin members slideably mounting said brake lining carriers on said force-receiving member on opposite sides of said disc, said brake lining carriers being adapted for sliding movement on said pin members toward and away from said disc, said pin members confining the movement of said brake lining carriers to movement in a generally axial direction relative to said disc, a generally C-shaped body member internally straddling said disc and having jaw portions extending radially outwardly on opposite sides of said disc, means in said body member for moving said brake lining carriers toward said disc including a piston slideable in a bore in said body member, means connecting the outer end of said piston to one of said brake lining carriers, a flexible sealing member extending between said piston and said body member for inhibiting the ingress of foreign matter into said bore, said piston and body member being adapted, upon delivery of fluid to said bore behind said piston, to cause said brake lining carriers to move toward said disc and to cause said body member to move relative to said disc, means slideably mounting said body member on said pin members and confining movement of said body member to a direction substantially parallel to the movement of said brake lining carriers and substantially parallel to the axis of rotation of said annular disc, the force of the torque created by the engagement of said brake linings with said annular disc being transferred through said brake lining carriers to said pin members, said means slideably mounting said body member on said pins comprising mounting portions extending laterally from said body member, said mounting portions having holes therein through which said pin members extend, bushing means in said holes surrounding said pin members, said bushing means permitting deflection of said body member relative to said pin members, an additional mounting means on said body member and an additional mounting means attached to one of said remaining members, said first mentioned additional mounting means having a first guide means, and said second mentioned additional mounting means comprising a second guide means on one of said members slideably mating with said first guide means on said first mentioned additional mounting means, said pin members including tapered portions, said force-receiving member having tapered holes therein in which the tapered portions of said pins fit, and fasteners located on said pin members on the opposite side of said force-receiving member from both of said carriers for securely connecting said pin member to said force-receiving member.

2. A disc brake for a vehicle wheel comprising a rotatable annular disc, a relatively stationary force-receiving member, a pair of brake lining carriers, brake linings carried by said brake lining carriers, two pin members located radially inwardly from the inner periphery of said annular disc and connected to said force-receiving member, said pin members slideably mounting said brake lining carriers on said force-receiving member on opposite sides of said disc, said brake lining carriers being adapted for sliding movement on said pin members toward and away from said disc, said pin members confining the movement of said brake lining carriers to movement in a generally axial direction relative to said disc, a generally C-shaped body member internally straddling said disc and having jaw portions extending radially outwardly on opposite sides of said disc, means in said body member for moving said brake lining carriers toward said disc including a piston slideable in a bore in said body member, means connecting the outer end of said piston to one of said brake lining carriers, said piston and body member being adapted, upon delivery of fluid to said bore behind said piston, to cause said brake lining carriers to move toward said disc and to cause said body member to move relative to said disc, means slideably mounting said body member on said pin members and confining movement of said body member to a direction substantially parallel to the movement of said brake lining carriers and substantially parallel to the axis of rotation of said annular disc, the force of the torque created by the engagement of said brake linings, with said annular disc being transferred through said brake lining carriers to said pin members, said means slideably mounting said body member on said pin members comprising mounting portions on said body member, said mounting portions having holes therein through which said pin members extend, bushing means in said holes surrounding said pin members, said bushing means permitting deflection of said body member relative to said pin members, an additional mounting means on said body member and an additional mounting means attached to one of said remaining members, said additional mounting means being slideably mated with one another, said additional mounting means attached to said one of said remaining members comprising an extension on one of said pin members, said extension being smaller in diameter than the diameter of the pin from which the extension extends.

References Cited

UNITED STATES PATENTS

| | | | |
|---|---|---|---|
| 1,755,830 | 4/1930 | Loughead. | |
| 2,966,964 | 1/1961 | Brueder | 188—73 |
| 3,199,635 | 8/1965 | Bessler et al. | 188—73 |
| 3,291,262 | 12/1966 | Rosanowski et al. | 188—73 |

OTHER REFERENCES

German printed application No. 1,189,397, March 1965, Teves.

GEORGE E. A. HALVOSA, Primary Examiner

U.S. Cl. X.R.

188—196